United States Patent [19]
Todori et al.

[11] Patent Number: 4,462,629
[45] Date of Patent: Jul. 31, 1984

[54] CONSTRUCTION OF CAR STRUCTURE

[75] Inventors: Seijiro Todori; Minoru Tanaka, both of Kudamatsu, Japan

[73] Assignee: Hitachi, Ltd., Tokyo, Japan

[21] Appl. No.: 410,602

[22] Filed: Aug. 23, 1982

[30] Foreign Application Priority Data

Nov. 11, 1981 [JP] Japan ................ 56-179689

[51] Int. Cl.³ ............................................. B62D 27/02
[52] U.S. Cl. ....................................... 296/30; 296/187; 296/188; 296/191; 296/203; 403/232.1; 403/246
[58] Field of Search .............. 296/185, 181, 183, 187, 296/188, 201, 202, 203, 29, 193, 194, 195, 191, 178, 29, 30; 403/232.1, 236, 246, 189, 403, 205

[56] References Cited

U.S. PATENT DOCUMENTS

| | | | |
|---|---|---|---|
| 1,737,547 | 12/1929 | Albright | 296/178 |
| 2,164,097 | 6/1939 | Tjaarda | 296/203 |
| 2,413,362 | 12/1946 | Maxwell | 403/230 |
| 2,666,238 | 1/1954 | Hagedorn | 403/230 |
| 3,752,512 | 8/1973 | Gilb | 403/232.1 |
| 3,907,445 | 9/1975 | Wendt | 403/232.1 |
| 4,230,361 | 10/1980 | Nachbur | 296/193 |

FOREIGN PATENT DOCUMENTS 160263 12/1981 Japan.

Primary Examiner—Robert R. Song
Attorney, Agent, or Firm—Antonelli, Terry & Wands

[57] ABSTRACT

In a construction of a car structure wherein a plurality of strength members each formed with an outdoor-side flange and an indoor-side flange are connected together and an outer plate member is connected to the outdoor-side flanges of the strength members, a joint member is provided which joint member includes outdoor-side and indoor-side flanges of the strength members and a web continuously connecting the flanges together three-dimensionally. The use of the joint member for connecting the strength members together facilitates production of the car structure and increases strength thereof.

9 Claims, 13 Drawing Figures

CONSTRUCTION OF CAR STRUCTURE

FIELD OF THE INVENTION

This invention relates to constructions of car structures, and, more particularly, it is concerned with a construction of a car structure in which a vertical structural member and a horizontal structural member arranged in vertical and horizontal directions, respectively, are joined together, and an outside plate is attached to the vertical and horizontal structural members.

BACKGROUND OF THE INVENTION

Conventional car structures will be described by referring to FIGS. 1-5. In FIGS. 1—3, the numeral 1 designates a window formed in a side wall of a car body, and the numeral 2 designates a vertical structural member arranged in a vertical direction. The vertical structural members 2 are arranged on opposite sides of each of the windows 1 in corresponding positions. The numeral 3 designates a horizontal structural member. The horizontal structural members 3 are arranged above and below each of the windows 1 in corresponding positions, and are joined by welding, at their opposite ends, to the vertical structural members 1. The vertical and horizontal structural members 2 and 3 are both of Z-shaped cross section. The numeral 4 designates an outside plate that is joined to the exterior side of the vertical and horizontal structural members 2 and 3 by spot welding. The numeral 6 designates a weld produced by spot welding. The numeral 5 designates a window corner reinforcing member joined to one of four corners of each window 1 at which the vertical and horizontal structural members 2 and 3 are joined together. The window corner reinforcing member 5 is joined by welding to the vertical and horizontal structural members 2 and 3, so as to avoid stress concentration in each corner of the window 1, indicated as a section B in FIG. 3, at which the vertical and horizontal structural members 2 and 3 are joined together.

In the aforesaid construction, strain would be produced in the vertical structural member 2, horizontal structural member 3 and window corner reinforcing member 5 when they are joined together by welding, and the car body would not be acceptable in external appearance when completed. Even if an attempt were made to perform straightening, this would only result in increased cost because the operation would require a multiplicity of steps. Particularly, when the aforesaid members are formed of thin sheets, the strain produced would be great. Thus, the prior art construction shown and described hereinabove would suffer the disadvantage that it is not possible to obtain a car structure that, overall, is light in weight.

Meanwhile, in sections C and D (FIG. 3), which each constitute a joint between the vertical structural member 2, horizontal structural member 3 and window corner reinforcing member 5, stress concentration would occur at end portions of each weld. Thus, the strength of each joint between the members 2, 3 and 5 would be necessary to increase the thickness of the members 2, 3 and 5 if it is desired to increase the strength of the joints, thereby making it impossible to lessen the weight of the car body. Also, a stress, $\sigma_{m2}$, of a very high magnitude would act on a portion of each outside plate 4 corresponding in position to the window corner reinforcing member 5 due to the curvature of the window corners, as shown in FIG. 10 by a curve e. Thus, the outside plates 4 should be able to withstand the aforesaid stress of high magnitude. This has made it necessary to increase the strength of the outside plates 4, as by increasing the thickness, thereby making it impossible to obtain an overall light weight car body structure.

Other constructions of a car structure of the prior art will be described by referring to FIGS. 4 and 5. In FIG. 4, the vertical structural member 2 and horizontal structural member 3 are joined together with a flat plate joint 7.

In this construction, when an out-of-plane bending force acts on a side wall portion having this car structure, the flat plate joint 7 would merely bear such bending force with flexural rigidity, so that the structure could not be expected to have high rigidity. When a shearing force acts between the vertical structural member 2 and horizontal structural member 3, such shearing force would be borne by the flat plate joint 7 alone, so that the structure could not be expected to have high rigidity.

In the construction shown in FIG. 5, the vertical structural member 2 and horizontal structural member 3 are joined together with a joint 8 having a flange 9 adapted to come into contact with an inner flange of the vertical structural member 2, and a flange 10 adapted to come into contact with a web of the vertical structural member 2. The joint 8 is constructed such that adjacent planar surface portions are at right angles to each other.

In the aforesaid construction, when an out-of-plane bending force acts on the joint between the vertical structural member 2 and horizontal structural member 3, such force would be borne by the bending rigidity of the flanges 9 and 10 alone, so that the structure could not be expected to have high rigidity. When an in-face shearing force acts on the joint between the vertical structural member 2 and horizontal structural member 3, the use of the joint 8 would suffer the disadvantage that the structure could not be expected to have sufficiently high rigidity. This would make it necessary to increase the thicknesses of the members 2, 3 and 4 to obtain the desired rigidity, making it impossible to obtain a car body having an overall light weight. If an additional reinforcing member were used to increase the strength of the structure by connecting it to the joint between the vertical structural member 2 and horizontal structural member 3, the attempt would merely increase the weight of the structure.

SUMMARY OF THE INVENTION

A principal object of this invention is to provide a construction of a car structure wherein the joint between a vertical structural member and a horizontal structural member constituting the car structure has its rigidity increased, to thereby increase the strength of the car structure.

According to the invention, there is provided a construction of a car structure comprising a vertical structural member arranged vertically in a car body, a horizontal structural member arranged lengthwise of the car body, the vertical structural member and the horizontal structural member each including an outside flange, an inside flange and a web keeping the outside flange and the inside flange at a predetermined spacing interval, and an outside plate attached to the outside flanges of the vertical structural member that is joined to the horizontal structural member, wherein the improvement comprises a joint member for joining the vertical structural member and the horizontal structural member together, the joint member including a first flange portion, corresponding to the outside flanges of the vertical structural member and the horizontal structural member, a second flange portion, corresponding to the inside flanges of the vertical structural member and the horizontal structural member, and a web keeping the flange portions at a spacing interval corresponding to the width of the webs of the vertical structural member and the horizontal structural member.

DETAILED DESCRIPTION OF THE PREFERRED EMBODIMENTS

Figure 8:
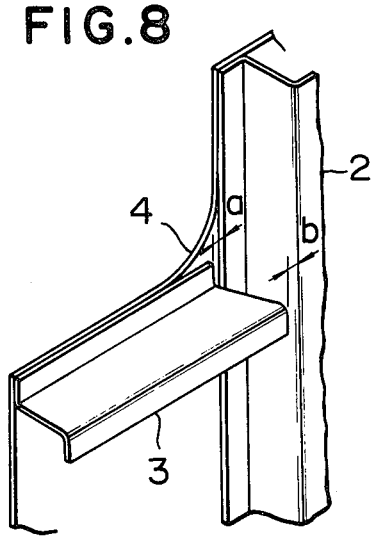
FIGS. 8 and 9 are perspective views of the various strength members and the skeleton joint shown in FIG. 7, in the connected condition, showing them before being connected together.
Figure 9:
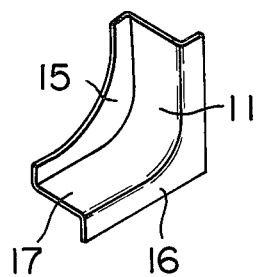

Preferred embodiments of the invention will now be described by referring to FIGS. 6-13. FIGS. 6-9 show one embodiment in which a vertical structural member 2 and a horizontal structural member 3 are each formed at one side thereof with outside flanges 12 and 12', and, at the opposite side, with inside flanges 13 and 13', respectively. The vertical structural member 2 and the horizontal structural member 3 each have a web constituting an intermediate portion extending between the outside and inside flanges 12, 12' and 13, 13' to keep them at a predetermined spacing interval. The vertical structural member 2 and the horizonal structural member 3 are of Z-shaped cross section. The numeral 11 designates a joint member for joining the vertical structural member 2 and the horizontal structural member 3 to each other by bringing the horizontal structural member 3 into abutting engagement at one end thereof with the vertical structural member 2. The joint member 11 includes an outer flange 15 constituting a first flange portion corresponding to the outside flanges 12 and 12' of the vertical structural member 2 and the horizontal structural member, respectively, an inside flange 16 constituting a second flange portion corresponding to the inside flanges 13 and 13' of the vertical structural member 2 and the horizontal structural member, respectively, and a web 17 extending between the outside flange 15 and the inside flange 16 to keep them at a predetermined spacing interval corresponding to the width of the webs of the vertical and horizontal structural members 2 and 3. The web 17 which corresponds to the webs of the vertical and horizontal structural members 2 and 3 is bent at a right angle, and the outside flange 15 is arcuate in shape corresponding to a corner of a window. The numeral 18 indicates points at which the vertical structural member 2, horizontal structural member 3, outside plate 4 and joint member 11 are joined together by spot welding, plug welding or rivet connections. In joining the vertical structural member 2 and the horizontal structural member 3 together, it is not necessary to bring them into direct contact with each other, as shown in FIG. 8. That is, a clearance a or b may be provided therebetween. The structure composed of the vertical structural member 2 to the horizontal structural member 3 is exerted on the structure, transferrence of the force is effected through the intermediary of the outside plate 4, and, at the same time, the force is transferred from the vertical structural member 2 to the joint member 11 through the joints 18. The force acting on the joint member 11 is further transferred to the horizontal structural member 3 through the joints 18. Thus, in the window corner, the transferrence of the force described hereinabove is effected through the intermediary of the outside plate 4 and the joint member 11. The thickness of the outside plate 4 being constant, proportions of the load applied to the outside plate 4 and the joint member 11 can be adjusted by varying the thickness of the joint member 11 or the position and number of the joints 18 between the joint member 11 and the vertical structural member 2, horizontal structural member 3 and outside plate 4.

Figure 10:
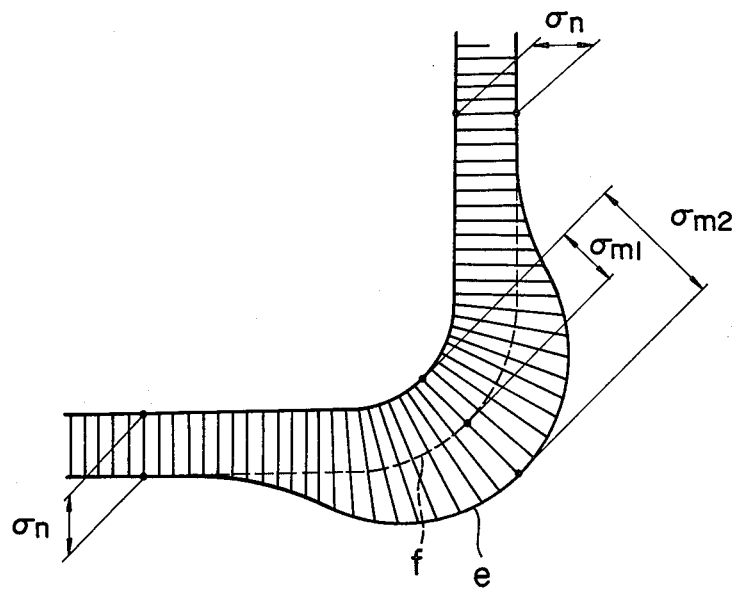
FIG. 10 is a diagrammatic representation of the distribution of stress showing the stresses developing in window corner sections of the car structure according to the invention and the prior art.

In the embodiment shown and described hereinabove, the joint member 11 includes the outside flange 15, inside flange 16 and web 17, and planar surface portions constituting the outside flange 15, inside flange 16 and web 17 are formed integrally with one another and extend contiguously, while adjacent planar surface portions are disposed at right angles to each other. The joint member 11 conforms in cross-sectional shape to the vertical and horizontal structural members 2 and 3. Thus, as shown in FIG. 10, the joint between the vertical and horizontal structural members 2 and 3 have a stress distribution in which a stress $\sigma_{m2}$ in a window corner is made close in value to the nominal stress $\sigma_n$ in other portions, as shown by curve f, making it possible to obtain unification of the stresses. This is conducive to prevention of stress concentration in the joint between the vertical and horizontal structural members 2 and 3 and increased strength of such joint. When a bending force and a shearing force are exerted on the joint between the vertical and horizontal structural members 2 and 3, deformation of the outside flange 15, inside flange 16 and web 17 of the joint member 11 is suppressed by one another, so that it is possible to increase the strength of the joint. This makes it possible to reduce the thicknesses of the vertical and horizontal structural members 2 and 3, outside plate 4 and joint member 11, thereby enabling an overall light weight car structure to be obtained.

In the aforesaid construction, the vertical and horizontal structural members 2 and 3 and the joint member 11 are joined together in such a manner that the planar surface portions of the joint member 11 are maintained in surface-to-surface contact with corresponding planar surface portions of the vertical and horizontal structural members 2 and 3. Thus, sufficiently high strength can be imparted to the joint by joining the outer flange 15 and inner flange 16 of the joint member 11 to the outside flanges 12 and 12' and the inside flanges 13 and 13', respectively, of the vertical and horizontal structural members 2 and 3. As described hereinabove, the joints 18 can be formed by spot welding, plug welding or rivet connections, so that strain produced in the vertical and horizontal structural members 2 and 3, outside plate 4 and joint member 11 by the heat of welding can be reduced. This is conducive to improved external appearance of the car structure and a reduction in the time and labor required for effecting straightening.

Figure 11:
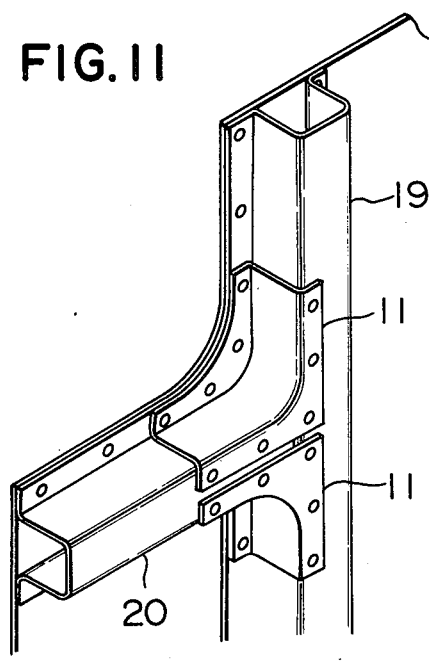
FIG. 11 is a perspective view of the car corner section comprising another embodiment of the car structure in conformity with the invention.

Another embodiment of the invention will be described by referring to FIG. 11, in which the joint member 11 is of the same shape and construction as that shown and described by referring to FIGS. 6-9. The numeral 19 designates a vertical structural member of a ⊓ shape (top hat shape) in cross section, and the numeral 20 a horizontal structural member of a ⊓⊓ shape in cross section. The vertical and horizontal structural members 19 and 20 each include outside flanges corresponding to the outside flanges 12 and 12' of the vertical and horizontal structural members 2 and 3, respectively, which are each located on one of opposite sides thereof, and a plurality of planar surface portions corresponding to the inside flanges 13 and 13' and webs of the vertical and horizontal structural members 2 and 3, which are located between the outside flanges. As shown, the joint member 11 is attached to both sides of the horizontal structural member 20.

As described hereinabove, the joint member 11 can be attached to both sides of the vertical and horizontal structural members 19 and 20 which are each of the ⊓⊓ shape cross-sectional shape. Thus, the strength of the joint having two joint members 11 is increased as compared with that of the joint having only one joint member 11.

Figure 12:
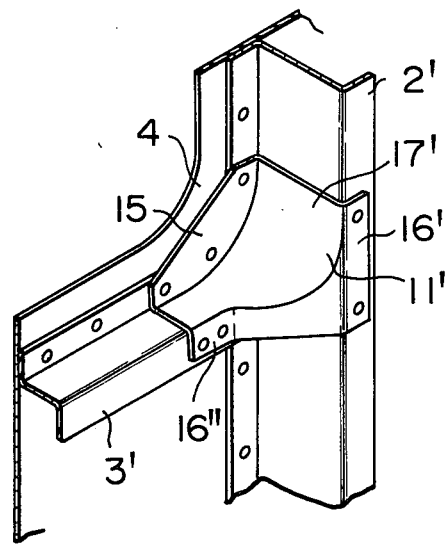
FIG. 12 is a perspective view of the car corner section comprising still another embodiment of the car structure in conformity with the invention.

Still another preferred embodiment will be described by referring to FIG. 12, in which a vertical structural member 2' has a web of a greater width than the web of the horizontal structural member 3'. A joint member 11' joins together the vertical and horizontal structural members 2' and 3', which differ from each other in the width of their respective web, and includes, in addition to the outside flange 15, an inner flange 16' corresponding to the inside flange of the vertical structural member 2', an inside flange 16" corresponding to the inside flange of the horizontal structural member 3', and a web 17' extending between the outside flange 15 and inside flange 16' and 16". As shown, in the web 17' of the joint member 11' has a three-dimensional curved surface.

The joint member 11' of the aforesaid construction, which is able to readily join together the vertical and horizontal structural members 2' and 3', which differ from each other in the width of the respective web, can achieve the same effects as the joint member 11.

By forming the outside flange and the inside flanges of the joint member in a manner to confrom in shape to those of the structural members which are intended to be joined by the joint member, it is possible to readily join together structural members that differ from each other in the width of their respective web.

Figure 1:
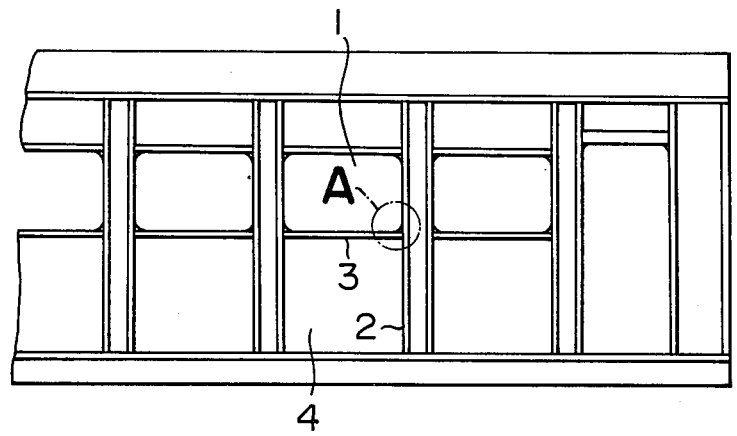
FIG. 1 is a front view of the side framing of a conventional car structure, as viewed from inside the car.
Figure 2:
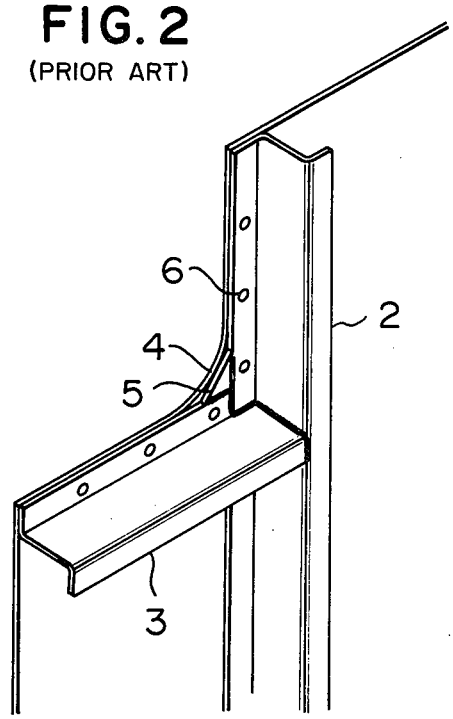
FIG. 2 is a perspective view, on an enlarged scale, of the section A shown in FIG. 1.
Figure 3:
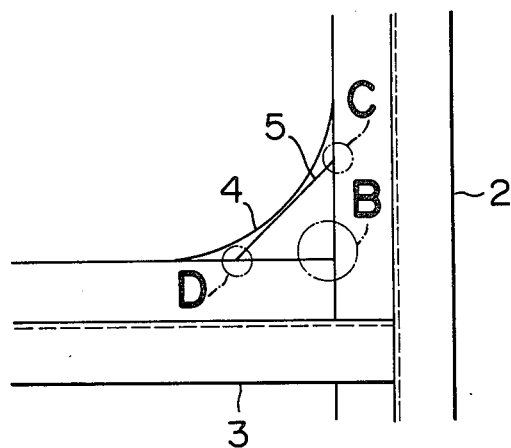
FIG. 3 is a front view, on an enlarged scale, of the window corner section shown in FIG. 2.
Figure 4:
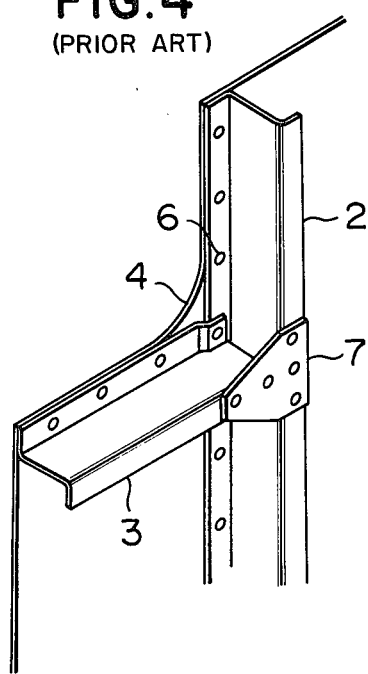
FIG. 4 is a perspective view of a window corner section using a planar plate joint in a conventional car structure.
Figure 5:
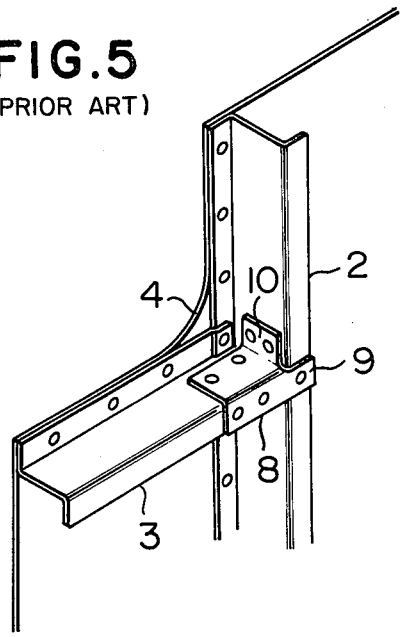
FIG. 5 is a perspective view of a window corner section using a two-dimensional bent joint in a conventional car structure.
Figure 6:
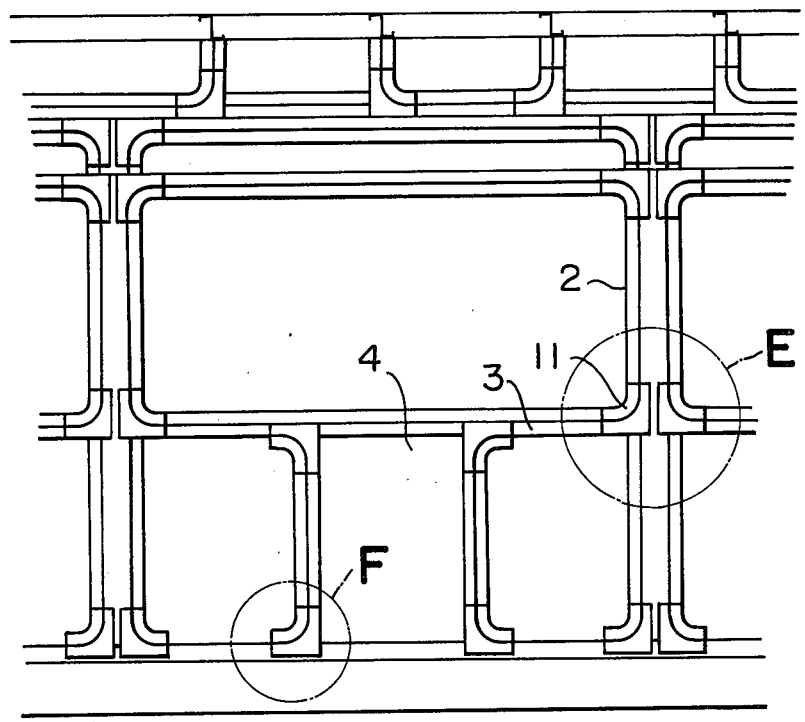
FIG. 6 is a front view of one embodiment of the car structure in conformity with the invention, showing its side framing as viewed from inside the car.
Figure 7:
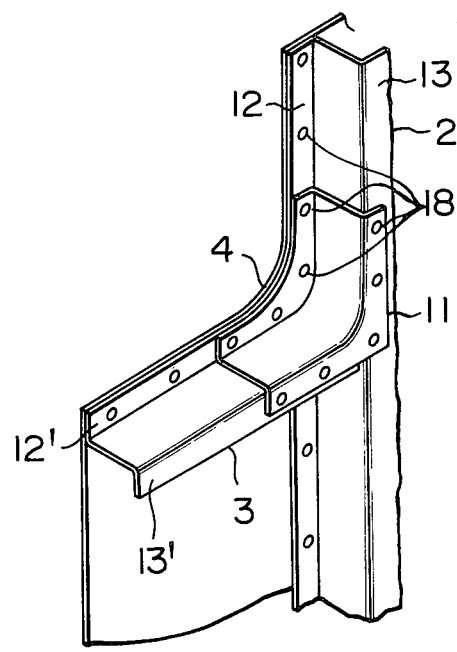
FIG. 7 is a perspective view, on an enlarged scale, of the section E shown in FIG. 6.
Figure 13:
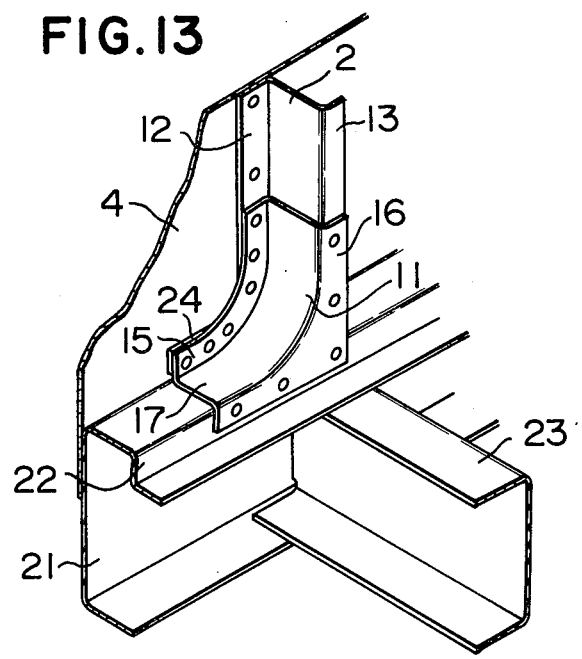
FIG. 13 is a perspective view, on an enlarged scale, of the section F shown in FIG. 6.

A joint between a side wall and an underframe shown in section F in FIG. 6 will be described by referring to FIG. 13. As shown, the numeral 21 designates a side-sill beam of an underframe, and the numeral 22 a vertical surface of a channel-like portion formed in the side-sill 21 which conforms in shape to the inside flange 13 of the vertical structural member 2. The numeral 23 designates a cross-beam of the underframe, and the numeral 24 a fitting strip that is located between the outside plate 4 and the outside flange 15 of the joint member 11.

By forming, at the side-sill 21, the vertical portion 22 for joining the joint member 11 thereto, it is possible to join the underframe to the side wall by means of the joint member 11. The joint provided in this way can achieve increased strength as is the case with the joint described hereinabove.

From the foregoing description, it will be appreciated that the construction of the car structure provided by the invention, in which structural members, such as vertical and horizontal structural members, are joined together by using a joint member, enables the strength of the joint between the structural members to be improved by avoiding stress concentration. This is conducive to reduced thickness of the structural members and reduced weight of the car structure. The structural members can be joined together with the joint member by means of spot welding, plug welding or rivet connections, so that strain produced in the structural members and the joint member by the heat of welding can be greatly reduced as compared with strain which would be produced when ordinary welding is relied on for producing the joint. This is conducive to improved external appearance of the car structure and a reduction in the time and labor required for effecting straightening.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

What is claimed is:

1. A construction of a car structure, comprising:
an outside plate;
a vertical structural member located in a car body against the outside plate in a vertically oriented parallel relationship thereto and a horizontal structural member located in said car body against said outside plate in a horizontally oriented parallel relationship thereto, said vertical structural member and horizontal structural member each including an outside portion and an inside portion oriented parallel to the outside plate and a web extending normal to said outside plate, between said outside and inside portions, to maintain the inside and outside portions of the structural members at a predetermined spacing interval; and
a joint member for joining said vertical and horizontal structural members together;
wherein the improvement resides in that:
said joint member includes a first flange portion extending parallel to said outside plate in the vicinity of the outside portions of both of said vertical and horizontal structural members, a second flange portion extending along the inside portions of both of said vertical and horizontal structural members parallel to said outside plate, and a web extending between said flange portions in such a manner that the flange portions are spaced apart by the web by a spacing interval corresponding to the width of the webs of the vertical and horizontal structural members; and said flange portions extending in opposite directions with respect to the web of said joint member and being formed integrally therewith.

2. A construction of a car structure as claimed in claim 1, wherein said vertical and horizontal structural members are joined together in such a manner that an end portion of one of the two structural members is abutted against the other structural member in a joint position.

3. A construction of a car structure as claimed in claim 1, wherein said web of said joint member is formed to have an arcuate shape conforming to the shape of the webs of the vertical and horizontal structural members.

4. A construction of a car structure as claimed in claim 1, wherein said first flange portion of said joint member is joined to outside flanges forming said outside portion of said vertical structural member, and said second flange portion of said joint member is joined to inner flanges forming said inside portion of said vertical and horizontal structural members.

5. A construction of a car structure as claimed in claim 1, wherein said joint member is essentially Z-shaped in cross section.

6. A construction of a car structure according to claim 5, wherein at least one of the structural members is Z-shaped in cross section.

7. A construction of a car structure according to claim 5, wherein at least one of the structural members is top hat shaped in cross section.

8. A construction of a car structure according to claim 5, wherein at least one of the structural members is a beam having a channel-like portion with a vertical surface for receiving the inside flange of the joint member.

9. A construction of a car structure according to claim 5, wherein the web of the horizontal structural member differs in width with respect to the width of the web of the vertical structural member and wherein the web of the joint member has a three-dimensional curved surface which interconnects the first flange portion with said second portion in a manner conforming them to the difference in width of the webs of said structural members.

* * * * *